INVENTORS
ROLAND HÖRNLEIN
GEROLD DOMHAN

BY Dicke & Craig
ATTORNEYS

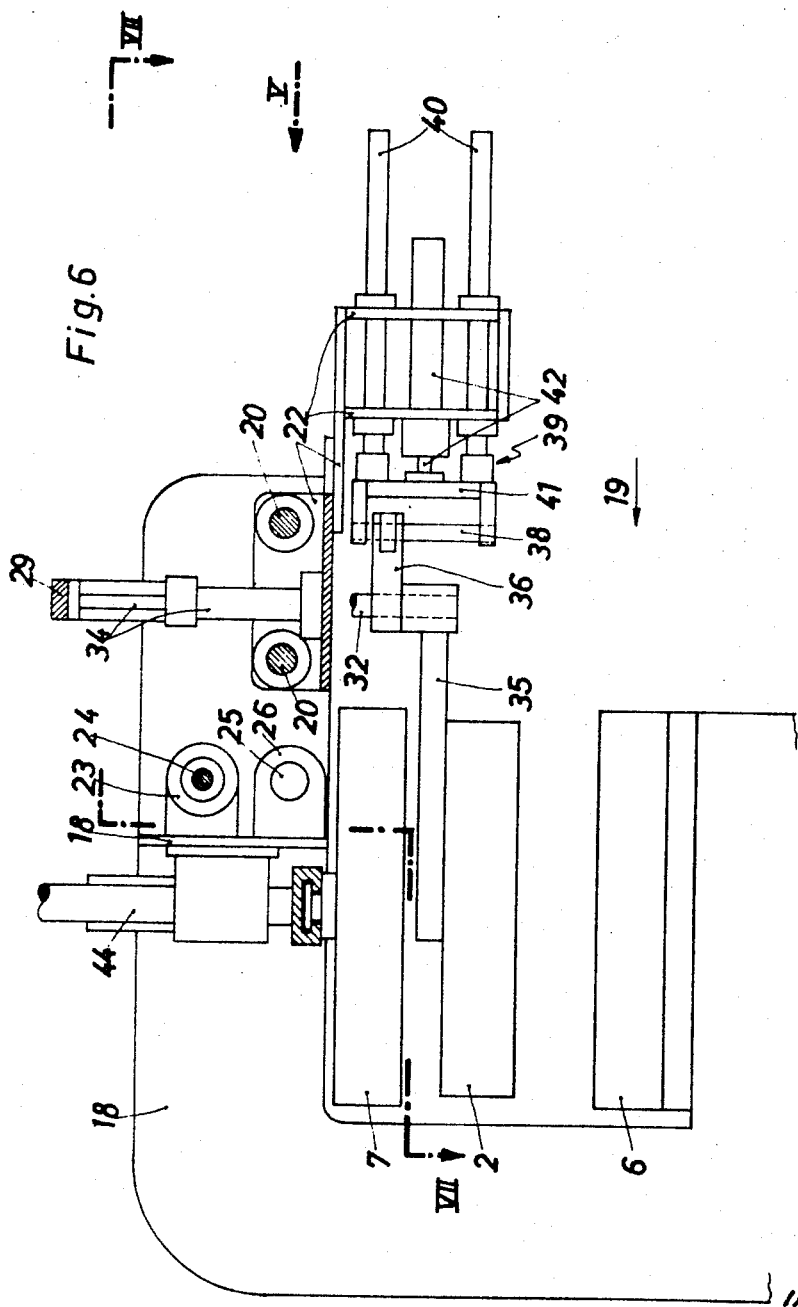

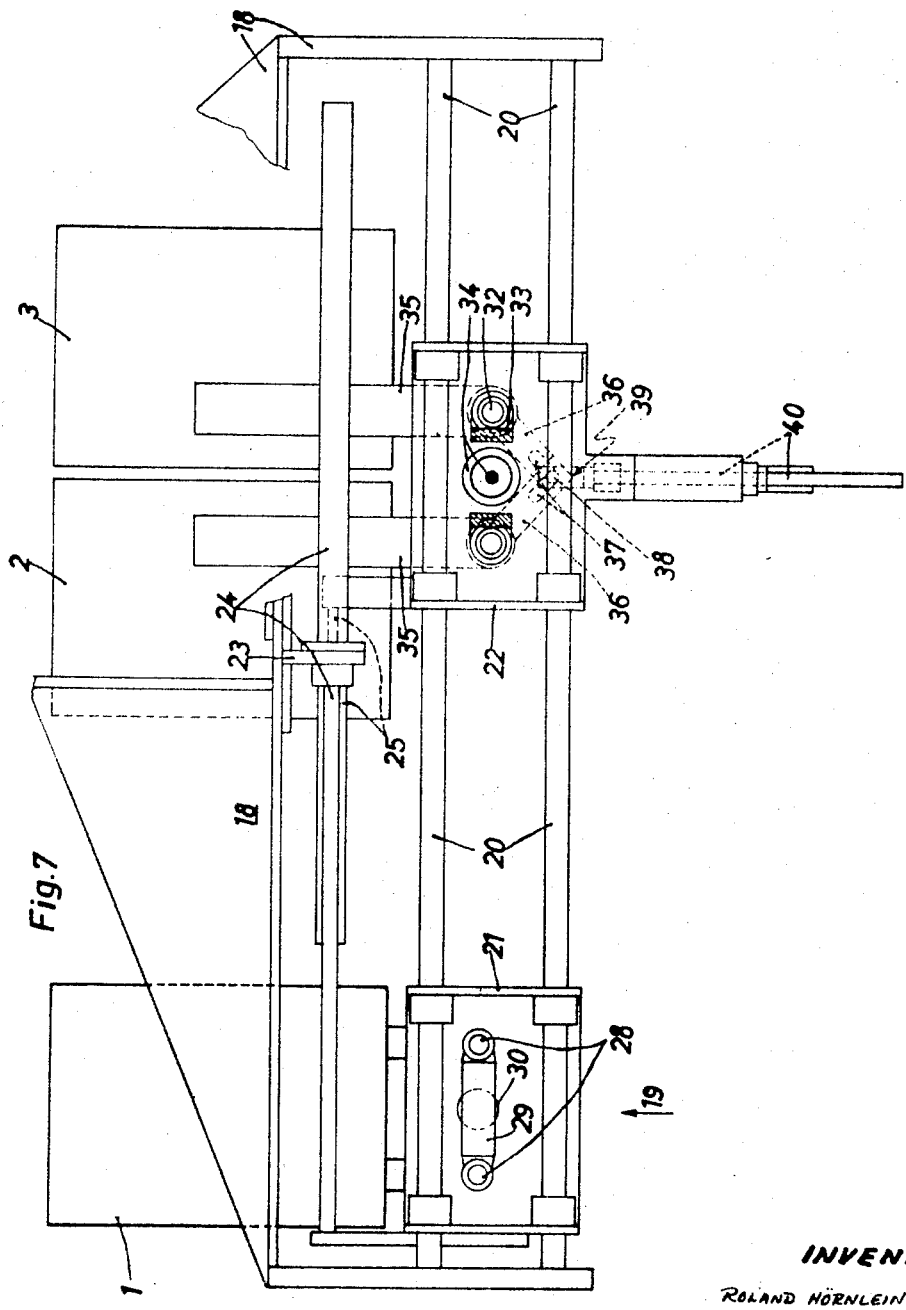

United States Patent Office 3,447,285
Patented June 3, 1969

3,447,285
TWO-STAGE EDGE-FOLDING MACHINE FOR FOIL-WRAPPED ITEMS
Roland Hörnlein, Schwabisch Gmund, and Gerold Domhan, Waldstetten, Germany, assignors to Walter Hörnlein Metallwarenfabrik, Schwabisch Gmund, Germany
Filed May 5, 1967, Ser. No. 636,364
Claims priority, application Germany, May 13, 1966,
H 59,392
Int. Cl. B65b 9/02
U.S. Cl. 53—393                                                10 Claims

ABSTRACT OF THE DISCLOSURE

The disclosure is of a two-stage edge-folding machine for foil-wrapped items such as moulded chocolate bodies in an installation for producing such items, comprising a two-stage edge-folding tool working with top and bottom dies and conveying devices, wherein the conveying devices consist of three suction devices movable up-and-down, the first suction device being transversely displaceable for transferring the items to the first edge-folding stage, and the other two suction devices being commonly transversely displaceable for transferring items from the first to the second edge-folding stages and from the second edge-folding stage to a delivery respectively and also being pivotable sideways out of and back into initial positions for giving an up-and-downwardly movable edge-folding tool access to the items in succession.

Introduction and background of the invention

Figure 1:
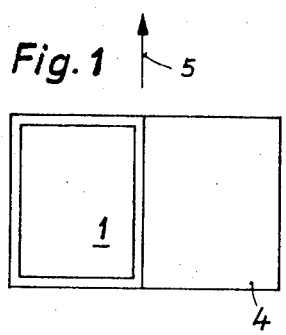
Figure 1:
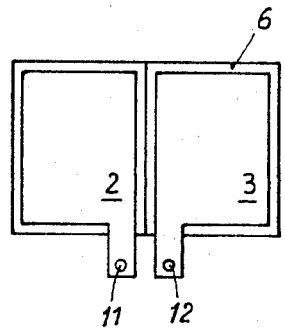
Figure 2:
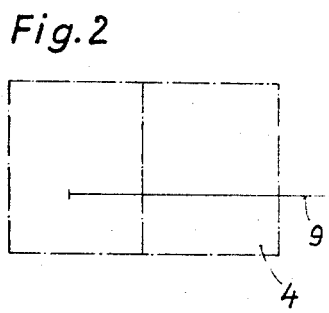
Figure 2:
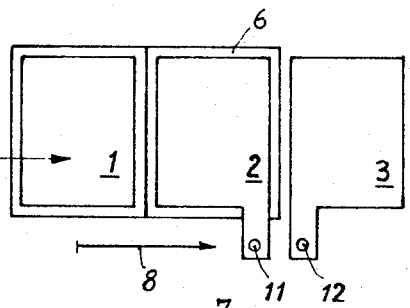
Figure 3:
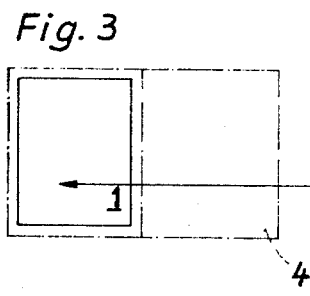
Figure 3:
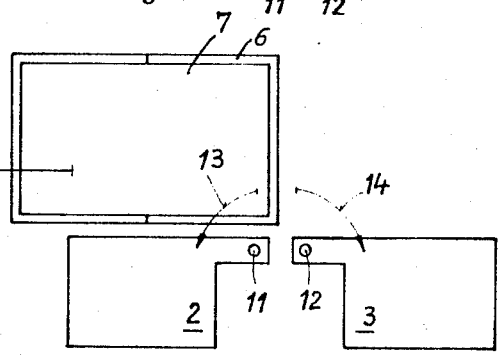

This invention relates to a two-stage edge-folding machine for foil-wrapped chocolate bodies or the like, in installations for the production of such chocolate bodies, provided with a two-stage edge-folding tool working with a bottom die and plunger-type top die and with conveying devices for conveying the wrapped chocolate bodies to be handled from a production mould to the first edge-folding stage, thence to the second edge-folding stage and thence to delivery. The invention is intended specially for an installation for the production of foil-wrapped hollow chocolate bodies according to U.S.A. Patent No. 3,381,631.

In known edge-folding machines of the foregoing kind the mentioned conveying devices consist of grippers coming inwards from the exterior, which are difficult to control and often cause breakage. The problem upon which the invention is based consists in producing an edge-folding machine of the initially stated kind which works especially quickly and securely.

Brief summary of the invention

To solve the above-mentioned problem, according to the invention the conveying devices consist of three suction plates movable upwards and downwards, of which the first is displaceable on a guide transversely of the conveying path of the chocolate production mould from the mould to the first edge-folding stage and the other two are displaceable commonly on the same or a similar transverse guide from the first to the second edge-folding stage and from the second edge-folding stage to the delivery respectively, and are pivotable through about 90° to left and right out of the vertical plunger path of the edge-folding tool and displaceable during its descent in this pivoted-out position back to the initial position on the transverse guide, in which then after the re-ascent of the edge-folding tool the pivoting in again and lowering of the second and third suction plates into the working positon take place.

Further description and advantages of the invention

The two-stage edge-folding tool preferably consists of two die plates lying closely side by side. So that the upper die, which works in plunger fashion, can descend the suction plates must previously be removed from the region above the lower die. This could be effected either by further displacement along the mentioned transverse guide or by a displacement along a second guide perpendicular to the transverse guide. Both types of solution are constructionally complicated and work too slowly. The pivoting out of the suction plates according to the invention in a surprising manner finds a simple and space-saving solution, and a very rapid course of work is obtained.

The first suction plate more advantageously posseses a displacement drive which is two or more times faster than the commonly displaceable second and third suction plates, so that it is removed again so rapidly from the region beside the second and third suction plates that the pivoting movement of the second and third suction plates can take place without hindrance.

In a constructionally advantageous manner the first suction plate is mounted for movement up and down by means of vertical guide columns in a transverse carriage displaceable on horizontal guide rods, on which carriage there engages for displacement a cylinder/piston drive bearing upon the machine frame, the carriage carrying a cylinder/piston drive engaging on the guide columns, for the upward and downward movement of the suction plate.

Moreover in a preferred type of embodiment of the invention the second and third suction plates are mounted by means of vertical guide columns for upward and downward movement in a transverse carriage displaceable on horizontal guide rods, on which carriage there engages for displacement a cylinder/piston drive bearing on the machine frame and which carriage carries a cylinder/piston drive engaging on the guide columns for the upward and downward movement of the suction plate, and in which carriage moreover there is mounted a shifting carriage with cylinder/piston drive displaceable transversely of the guide rods, which engages on the suction plates for common pivoting. The suction plates are preferably pivotable about the vertical guide columns. In order to permit the upward and downward movement of the suction plates in relation to the shifting carriage which effects the pivoting, the latter possesses a vertical guide pin which engages in slots of two lever arms which protrude from the suction plates beyond the guide columns. These lever arms slide in the slots along this guide pin.

Brief description of the views in the drawing

Figure 4:
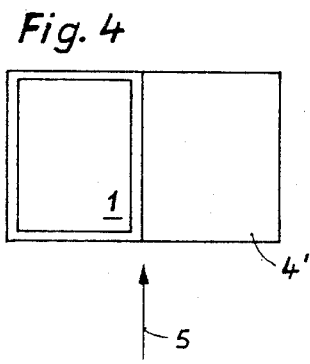
Figure 4:
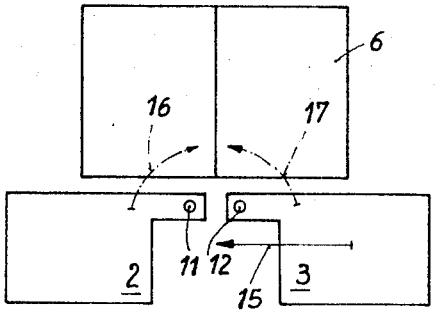
Figure 5:
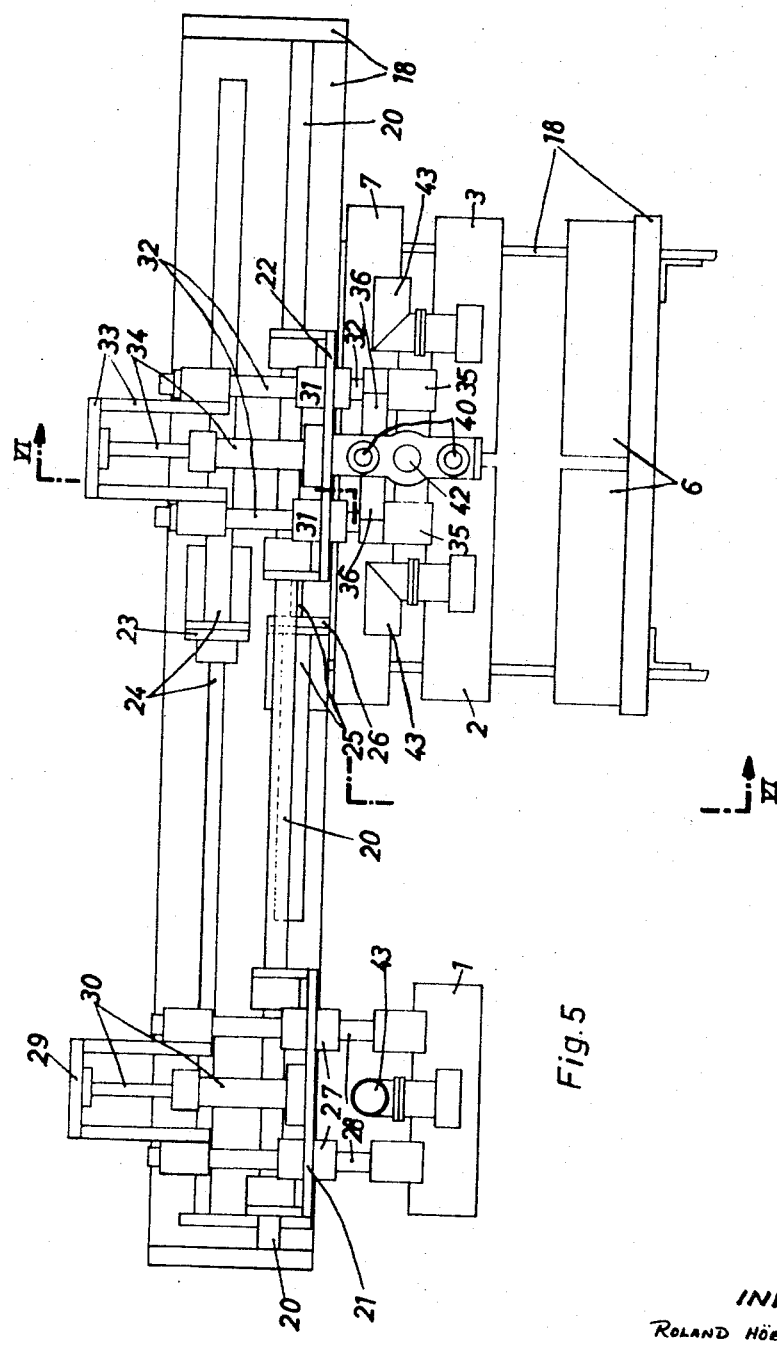

Further details and advantages of the invention will be explained hereinafter by reference to an example of embodiment which is illustrated diagrammatically in the accompanying drawings, wherein:

FIGURES 1–4 show diagrammatically the courses of movement of the suction plates and of the edge-folding tool, FIGURE 5 shows a front view of the example of embodiment according to the invention in the direction of the arrow V in FIGURE 6, FIGURE 6 shows a section along the line VI—VI in FIGURE 5 with lateral elevation of the essential parts and FIGURE 7 shows a section along the line VII—VII in FIGURE 6 with a plan view of the essential parts, the edge-folding tool being omitted.

Detailed description

In the drawings, in FIGURES 1–4 the first suction plate is designated by 1, the second suction plate by 2 and the third suction plate by 3. 4 is a production frame for the chocolate bodies which moves in a chain of such frames in the direction of the arrow 5 in the production plant. 6 designates the bottom die of the edge-folding tool and 7 the top die, which works in plunger fashion. For the sake of simplicity the latter is illustrated only in FIGURE 3.

The manner of operation is as follows. In the initial position according to FIGURE 1 the first suction plate 1 is situated above the production mould 4 and receives the finished, foil-wrapped chocolate bodies therefrom by suction, the foil half shells of which must still be connected with one another along their edges by turning over in edge-fold fashion. The second and third suction plates 2 and 3 are situated above the bottom die 6 and receive the chocolate bodies treated there, by suction. In the next step according to FIGURE 2 the second and third suction plates are shifted to the right in the direction of the arrow 8, the second suction plate 2 conveying the chocolate bodies from the first edge-folding stage (left part of the bottom die) to the second edge-folding stage (right part of the bottom die), while the third suction plate 3 conveys the finished chocolate bodies from the second edge-folding stage (right part of the bottom die) to the right to a delivery device where they are conducted away in any manner. Meanwhile the first suction plate 1 moves rapidly to the right in the direction of the arrow 9 (FIG. 2) and conveys the sucked-up chocalate bodies from the production mould 4 to the first edge-folding stage (left part of the bottom die). Moreover the production mould 4 from which the chocolate bodies were removed moves in the direction of the arrow 5 (FIG. 4) further to the next station.

Now chocolate bodies are inserted into both parts of the bottom die 6 for the execution of the edge-folding, the edges of the foil half shells, resting on one another, being commonly tilted upwards in the first stage and completely folded over in the second stage. These operations can be carried out by the plate-like top die 7 working in plunger fashion, as soon as the suction plates 1 and 2 are removed from above the bottom die 6. For this purpose the first suction plate 1 moves rapidly to the left again in the diretcion of the arrow 10 into its initial position. Meanwhile the second and third suction plates 2 and 3 pivot about their spindles 11 and 12 in the direction of the arrows 13 and 14 respectively (FIGURE 3) to the left and right through 90°, so that the top die 7 can descend immediately. The outward pivoting takes place very rapidly.

In the next stage according to FIGURE 4, still during the descent and re-ascent of the top die 7, the second and third suction plates 2 and 3 in the pivoted-out condition move in the direction of the arrow 15 (FIGURE 4) to the left until their vertical spindles 11, 12 have reached the initial position according to FIGURE 1. After the re-ascent of the top die 7 then the pivoting-in of the suction plates 2 and 3 again takes place in the direction of the arrows 16 and 17 respectively (FIGURE 4) into the initial position as shown in FIGURE 1. Meanwhile the next production mould 4' comes beneath the first suction plate 1. In the example of embodiment this production mould 4 or 4' is a hinged frame, the upper part of which is hinged away to the right in the drawing.

In FIGURES 5-7, which show one type of embodiment of the invention in a somewhat simplified manner, the suction plates are designated correspondingly again by 1, 2 and 3, the bottom die by 6 and the top die by 7. For the sake of simplicity the drives and controls for the top die 7 of the edge-folding tool are omitted. Moreover in FIGURE 7 the top die 7 is omitted.

In the machine frame 18 two horizontal guide rods 20 are arranged traversely of the conveying path of the production moulds, which path extends in FIGURES 1–4 in the direction of the arrow 5 and in FIGURES 6 and 7 in the direction of the arrow 19, upon which rods there run a transverse carriage 21 carrying the first suction plate 1 and a transverse carriage 22 carrying the second and third suction plates 2, 3. The first transverse carriage 21 is driven in the direction of the guide rod 20 by means of a cylinder/piston drive 24 bearing at 23 on the machine frame, while for the corresponding drive of the second transverse carriage 22 there serves a cylinder/piston drive 25 which bears at 26 on the machine frame.

The first transverse carriage 21 for the first suction plate 1 guides, in mounting eyes 27, two vertical guide columns 28 which are secured to the first suction plate 1 and are connected with one another above the transverse carriage 21 by means of a cross yoke 29 in the manner which may be seen from the drawing. On this cross yoke there engages, in the illustrated manner, a cylinder/piston drive 30 bearing on the transverse carriage 21, serving for the upward and downward movement of the suction plate 1. For the sake of simplicity all hydraulic and electric connections are omitted in the drawing.

In a similar manner in the second transverse carriage 22 two vertical guide columns 32 are mounted for upward and downward movement in mounting eyes 31 and connected in their upper region with one another through a cross yoke 33. Upon the latter there engages a cylinder/piston drive 34 bearing on the transverse carriage 22 and serving for the upward and downward movement of the guide columns 32. The latter are rotatably mounted in the cross yoke 33 and firmly connected beneath the transverse carriage 22, in the manner visible from the drawing, through an arm 35 in each case with the suction plates 2 and 3 respectively. The two vertical guide columns 32 form the pivot spindles 11 and 12 in FIGURES 1 to 4, about which the suction plates 2, 3 are pivotable. Above the arms 35 there are secured lever arms 36 protruding on the guide columns 32, which interengage at their free ends and are provided there with slots 37 which can slide up and down on a vertical guide pin 38 of a shifting carriage 39 displaceably mounted in the transverse carriage 22 perpendicularly of the guide rods 20.

This shifting carriage 39 consists essentially of two guide rods 40 which are mounted in mounting eyes of the transverse carriage 22 and connected with one another by means of a cross-yoke 41 at their ends facing the suction plates. There in the maner which may be seen from FIGURE 6 there engages a cylinder/piston drive 42 bearing on the transverse carriage 22. Before the cross-yoke 41 there is arranged the vertical guide pin 38. On displacement of the shifting carriage 39 by the cylinder/piston drive 42 the two lever arms and thus the suction plates 2 and 3 are pivoted commonly to the left and right respectively. The vertical guide pin 38 here permits a play which allows the vertical upward and downward movement of the suction plates. Thus the pivoting can take place independently of the vretical position of the suction plates and also independently of the position of the transverse carriage 22 in relation to the guide rods 20.

The vacuum connections to the suction plates 1, 2 and 3 are designated by 43 in FIGURE 5. In FIGURE 6 the mounting of the top die 7, working in plunger fashion, of the edge-folding tool is indicated at 44. It is moved upwards and downwards in a manner which is not illustrated further.

We claim:
1. For a two-stage edge-folding machine for foil-wrapped chocolate bodies in installations for the production of such bodies in production moulds along a conveying path:
    a system for conveying the wrapped chocolate bodies to be edge-folded from the respective one of said production moulds to the first edge-folding stage, thence to the second edge-folding stage and thence to a delivery position, said system comprising a first suction device and a second suction device and a third suction device, said suction devices being upwardly and downwardly movable, for conveying purposes, said first suction device being displaceable transversely of the respective said production mould therefrom to said first edge-folding stage, said second and said third suction devices being displaceable commonly from said first edge-folding stage to said second edge-folding stage and from said second edge-folding stage to said delivery position respectively and being pivotable through approximately 90° to the left and right respectively out of the working path of a respective edge-folding tool and during edge-folding being displaceable in this pivoted-out position back to the initial position in which then, after removing of the said edge-folding tool, the pivoting-in again of said second and third suction devices takes place.

2. A system as claimed in claim 1, comprising a first drive for moving said first suction device transversely of said respective production mould and a second drive for moving commonly said second and third suction devices from said first edge-folding stage to said second edge-folding stage and from said second edge-folding stage to said delivery position respectively, said first drive being at least two times more rapid than said second drive.

3. A two-stage edge-folding machine for foil-wrapped chocolate bodies in installations for the production of such bodies in moulds along a conveying path, comprising a two-stage edge-folding tool having a bottom die and a top die movable vertically to one another, said bottom die and said top die having a first-stage edge-folding portion and a second-stage edge-folding portion lying laterally side-by-side, a first suction plate movable upwardly and downwardly and displaceable transversely of the respective production mould from said mould to said first-stage edge-folding portion for conveying the wrapped chocolate bodies from said mould to said first-stage edge-folding portion, a second suction plate and a third suction plate both movable upwardly and downwardly and displaceable commonly from a first position over said first-stage edge-folding portion to a second position over said second-stage edge-folding portion and from said second position over said second-stage edge-folding portion to a position of delivery beside said second-stage edge-folding portion respectively, in said second position said second and said third suction plates being pivotable horizontally through approximately 90° to the left and right respectively out of the path of vertical movement of said bottom and top die respectively, during moving said bottom and top die to one another said second and third suction plates being displaceable in pivoted-out position back from said second position to said first position in which after moving said bottom and top die from one another said second and third suction plates are pivotable in again for conveying the wrapped chocolate bodies from said first-stage edge-folding portion to said second-stage edge-folding portion and from said second-stage edge-folding portion to said position of delivery respectively.

4. A machine as claimed in claim 3, comprising a common transverse guide for said first suction plate and said second and third suction plates, said guide extending transversely of said conveying path of the respective production mould.

5. A machine as claimed in claim 3, comprising a machine frame, a horizontal guide for said first suction plate extending transversely of said conveying path of the respective production mould, a carriage (21) displaceable on said horizontal guide, a first cylinder/piston drive (24) bearing on said machine frame and engaging said carriage for displacement, a vertical guide on said carriage for guiding said first suction plate for vertical upward and downward movement, and a second cylinder/piston drive (28) bearing on said carriage and engaging said first suction plate for said upward and downward movement.

6. A machine as claimed in claim 3, comprising a machine frame, a horizontal first guide (20) for said second and third suction plates extending transversely of said conveying path of the respective production mould, a first carriage (22) displaceable on said horizontal first guide, a first cylinder/piston drive (25) bearing on said machine frame and engaging said first carriage for displacement, a vertical second guide (32) on said first carriage for guiding said second and third suction plates for vertical upward and downward movement, a second cylinder/piston drive (34) bearing on said first carriage and engaging said second and third suction plates for said upward and downward movement, a horizontal third guide (40) on said first carriage extending transversely of said horizontal first guide, a second carriage (39) guided on said horizontal third guide, and a third cylinder/piston drive (42) bearing on said first carriage and engaging said second carriage, said second carriage engaging on said second and third suction plates for their common pivoting.

7. A machine as claimed in claim 6, in which said vertical second guide comprises for each of said second and third suction plates a vertical guide column (32) and the respective suction plate is pivotable about the respective vertical guide column.

8. A machine as claimed in claim 6, in which said second carriage (39) is connected with said second and third suction plates through a vertical sliding connection which permits their upward and downward movement.

9. A machine as claimed in claim 8, comprising a lever arm on each of said second and third suction plates, said lever arm having an end portion (36) extending over the pivoting axis of the respective suction plate, a horizontal slot (37) in said end portion, the end portions of said lever arms of said second and third suction plates crossing each other with their slots, and a vertical guide pin (38) on said second carriage (39) engaging commonly the slots of both of said lever arms for pivoting said second and third suction plates.

10. A machine as claimed in claim 6, in which said second carriage (39) comprises two guide rods (40) lying one above the other for the purpose of said horizontal third guide, bearing in said first carriage (22) for said two guide rods, and a transverse element connecting said two guide rods, said third cylinder/piston drive (42) engaging said transverse element.

References Cited

FOREIGN PATENTS 726,968   10/1942   Germany.

THERON E. CONDON, *Primary Examiner.*

N. ABRAMS, *Assistant Examiner.*

U.S. Cl. X.R.

53—371